United States Patent [19]
Dufresne et al.

[11] Patent Number: 5,854,162
[45] Date of Patent: Dec. 29, 1998

[54] OFFSITE REGENERATION PROCESS FOR A CATALYST CONTAINING AT LEAST ONE PRECIOUS METAL

[75] Inventors: Pierre Dufresne, Valence; Nilanjan Brahma, La Voulte Sur Rhone, both of France

[73] Assignee: Europeenne de Retraitement de Catalyseurs Eurecat, France

[21] Appl. No.: 949,683

[22] Filed: Oct. 14, 1997

Related U.S. Application Data

[63] Continuation of Ser. No. 551,798, Nov. 7, 1995, abandoned.

[30] Foreign Application Priority Data

Nov. 7, 1994 [FR] France ................................. 94 13431

[51] Int. Cl.⁶ ............................ B01J 20/34; B01J 38/12; B01J 38/18; B01J 38/22
[52] U.S. Cl. ................................ 502/45; 502/38; 502/50
[58] Field of Search ..................... 502/38, 45, 50

[56] References Cited

U.S. PATENT DOCUMENTS 4,128,338   12/1978   Huin et al. ........................ 252/415
5,034,117   7/1991   De Bonneville et al. ................ 208/14

*Primary Examiner*—Michael L Lewis
*Assistant Examiner*—Alexander G. Ghyka
*Attorney, Agent, or Firm*—Millen, White, Zelano, & Branigan, P.C.

[57] ABSTRACT

The invention concerns a process for the regeneration of a used hydrocarbon treatment catalyst, preferably a reforming catalyst, containing at least one precious metal preferably platinum, optionally at least one additional metal selected from the group formed by metals from groups 7, 8, 9, 10, 13 and 14 of the periodic classification of the elements and copper, optionally and preferably at least one halogen, preferably chlorine, and at least one porous support, preferably alumina, said process comprising at least one of the following two successive steps: at least one step (1) for the combustion of the coke present on said catalyst, carried out in the presence of an oxygen-containing gas, at a temperature in the range of 300° C. to 680° C. for a time in the range 0.3 to 7 hours, at least one step (2) for oxyhalogenation, preferably oxychlorination, carried out in a controlled air atmosphere, at a temperature in the range 350° C. to 550° C., for a time in the range 0.3 to 3 hours and in the presence of a halogenated compound, wherein said process is carried out offsite, and in that a moving bed furnace is used for combustion step (1) and for oxyhalogenation step (2).

14 Claims, No Drawings

OFFSITE REGENERATION PROCESS FOR A CATALYST CONTAINING AT LEAST ONE PRECIOUS METAL

This application is a continuation of application Ser. No. 08/551,798, filed Nov. 7, 1995, now abandoned.

The invention concerns a process for the regeneration of a used hydrocarbon treatment catalyst, preferably a reforming catalyst, containing at least one precious metal, preferably platinum, optionally at least one additional metal selected from the group formed by metals from groups 7, 8, 9, 10, 13 and 14 of the periodic classification of the elements and copper, optionally at least one halogen, preferably chlorine, and at least one porous support, preferably alumina. The invention particularly concerns, for example, regeneration of a catalytic reforming catalyst containing at least platinum and at least one halogen, preferably chlorine.

BACKGROUND OF THE INVENTION

The catalytic reforming process is widely used by refiners to valorize petroleum naphtha obtained from distillation, with a low octane number. Chemical transformation of the petroleum naphtha feed, which mainly comprises hydrocarbons containing 7 to 10 carbon atoms per molecule, consists principally of transforming the n-paraffins and naphthenes contained in the feed into aromatic hydrocarbons. The most desirable of these reactions are highly endothermic. This transformation, termed catalytic reforming, is generally carried out at high temperature (of the order of 500° C.), at low to medium pressure (3.5 to $25 \times 10^5$ Pa) and in the presence of a catalyst. It produces a reformate, a hydrogen-rich gas, a combustible ($C_1$–$C_2$) gas and liquefied gases ($C_3$+$C_4$), as well as coke.

The reforming catalyst is generally a porous solid in the form of small rods (extrudates), spherules or grains, and comprises alumina, chlorine, platinum and an additional metal selected from the group formed by metals from groups 7, 8, 9, 10, 13 and 14 of the periodic classification of the elements and copper, such as thallium, manganese, germanium, indium, iridium, rhenium or tin, preferably rhenium or tin. The reforming catalyst is a substance of complex manufacture with a very high cost due to the use of precious metal(s).

During the catalytic reforming process, the catalyst activity gradually reduces, principally because of the deposition of coke at the surface. It is thus periodically necessary to carry out a regeneration operation which mainly comprises elimination of the coke by controlled burning, generally in the presence of air diluted with nitrogen (which operation is hereinafter termed coke combustion) and oxychlorination, which primarily redisperses the metals and also adjusts the acidity of the alumina by addition of chlorine or an organic chlorine-containing compound in an oxidizing medium (this operation is hereinafter termed oxychlorination).

The conventional reforming catalyst regeneration operation takes place in situ, i.e., on the same site as the refinery (onsite), and is carried out in different fashions depending on the catalytic reforming process.

When the catalytic reforming process is a continuous catalytic reforming (CCR) process, the catalyst progressively flows (circulating bed) through a number of reaction zones in which the feed circulates and where the chemical reactions associated with catalytic reforming take place, following which it is extracted from the final reaction zone and directed towards a regeneration zone. The duration of a (reaction+regeneration) cycle for the catalyst is generally in the range 0.1 to 10 days. In the regeneration zone, the catalyst is normally firstly stored in a collecting drum then taken to the regeneration zone proper where coke combustion followed by oxychlorination is carried out. The catalyst is returned to the first reaction zone, generally after passage through a collecting drum, after a reduction operation which activates the catalyst for the reforming reaction, and optionally a sulphuration operation which corresponds to passivation of the additional metal used by sulphur, this operation being carried out if the nature of this metal so dictates (for example, sulphuration is carried out for rhenium but not for tin). However, this reduction operation and the optional sulphuration reaction can also take place in the first reaction zone. Finally in this case, the catalyst is regenerated in a zone which is distinct from the reaction zones but in direct contact therewith.

When the reforming reaction is a semi-regenerative type process (also known as a fixed bed process), the catalyst is present in reaction zones through which the feed circulates, but the catalyst does not circulate from one reaction zone to another while the chemical reactions associated with catalytic reforming are taking place. In this case, regeneration is periodically carried out, generally for 7 to 10 or 15 days every 3 months to 12 months of use depending on the severity of the operations. The catalyst remains in the reaction zone which becomes the regeneration zone. In certain types of processes comprising several reaction zones, it is also possible to isolate one reaction zone from other reaction zones so that it can act as a regeneration zone while the other reaction zones continue to carry out catalytic reforming, but only a portion of the catalyst present in the reaction zones is thereby regenerated. Thus in this case the catalyst is regenerated in a zone which is also the reaction zone.

There are also cases where the catalytic reforming process is a mixed technology process, i.e., one process combines reaction zones with semi-regenerative technology with reaction zones with continuous technology. In this case, the two types of regeneration are thus used.

These catalytic reforming processes, which are conventional and widely used in refineries, encounter problems during their operation, principally due to a lack of flexibility in the regeneration systems used.

Regeneration in a CCR type process is directly affected by events in the reaction zones, and any abnormal operation of these zones has a direct effect on the operation of the regeneration zone, since the regeneration zone is generally only programmed for operation using normal conditions. Thus any dysfunction, which manifests itself in a rise in the coke content in the catalyst to be regenerated compared with the normal content, generally 4% to 5% by weight of coke, requires either the catalyst regeneration rate to be reduced to avoid considerable exothermicity problems in the regeneration zone, meaning in total a reduction in the feed flow rate and thus a reduction in the production of the unit, which is costly to the refiner; or the catalyst must be completely changed and the used catalyst (if it cannot be re-used) given to a platinum recovery company. Further, coke combustion may be incomplete.

Regarding regeneration in a semi-regenerative process, this requires stopping the production unit for the entire duration of the regeneration step, which is costly to the refiner. If there is a dysfunction in the reaction zones which produces a higher coke content than normal, the stop period is even longer.

Further, regeneration in such catalytic reforming processes poses also technical problems. Thus, these regenerations involve the use of air diluted with nitrogen (with an oxygen content of 0.1% to 1% by volume) to burn the coke, in particular when the flow rates of the combustion gas are high, and also involve the injection of a chlorinated compound during this step, which causes environmental problems. In addition, regenerations carried out in accordance with the prior art in continuous (CCR) type processes or semi-regenerative processes cannot ensure perfect homogeneity of the combustion or oxychlorination treatment for all the catalyst particles. Finally, these catalytic reforming processes comprising onsite regeneration do not allow the whole of the catalyst to be assessed since each sample taken from the unit (production and regeneration) is localized and not representative of the whole of the catalytic mass. Incomplete coke combustion of the whole of the catalytic mass, for example, may not be observed in a sample of the catalyst. Thus catalytic reforming processes in particular require continuous monitoring of the catalyst which is as accurate as possible, more so than for other refining and petrochemical processes.

Offsite catalyst regeneration processes exist in refining for used hydrotreatment catalysts. They mainly comprise a step for stripping residual hydrocarbons, and a sulphur and carbon combustion step. But they do not comprise a oxyhalogenation step. Hydrotreatment catalysts, which do not in general contain precious metals, thus do not undergo the same regeneration treatments as catalytic reforming catalysts.

SUMMARY OF THE INVENTION

The aim of the invention is to provide offsite regeneration methods for used catalytic reforming catalysts which produce technical results which are at least as good and normally better than conventional onsite regeneration processes for catalytic reforming catalysts which are currently in use.

A further aim of the invention is to provide offsite regeneration methods for any used catalyst for the treatment of hydrocarbons containing at least one precious metal, preferably platinum, and in which regeneration must comprise at least one coke combustion step and one oxyhalogenation step, preferably oxychlorination, to redisperse the precious metal. The regeneration treatment of the invention can eliminate the major portion of the coke deposited on the support and redisperse the metallic phase.

The invention thus concerns a process for the regeneration of a used hydrocarbon treatment catalyst, preferably a reforming catalyst, containing at least one precious metal selected from the group formed by silver, gold, ruthenium, rhodium, palladium, osmium, iridium and platinum, preferably platinum, optionally at least one additional metal selected from the group formed by metals from groups 7, 8, 9, 10, 13 and 14 of the periodic classification of the elements and copper, optionally and preferably at least one halogen, preferably chlorine and at least one porous support, preferably alumina, said process comprising at least one of the following two successive steps:

at least one step (1) for combustion of the coke present on said catalyst carried out in the presence of an oxygen-containing gas, at a temperature in the range 300° C. to 680° C., preferably in the range 350° C. to 550° C., for a time in the range 0.3 to 7 hours, at least one step (2) for oxyhalogenation, preferably oxychlorination, carried out in a controlled air atmosphere, at a temperature in the range 300° C. to 650° C., preferably in the range 350° C. to 550° C., for a time in the range 0.3 to 3 hours and in the presence of a halogenated compound, characterized in that said process is carried out offsite, and in that a moving bed furnace is used for combustion step (1) and oxyhalogenation step (2).

Examples of moving bed furnaces used in the process of the invention are agitated bed furnaces, falling bed furnaces (i.e., thin layer, with a cylindrical or radial reactor), fluidized bed furnaces or other furnaces such as circulating bed furnaces. Rotolouvre furnaces (i.e., moving, agitated and thin layer) or belt furnaces (i.e., thin layer and moving) can be used, for example.

In the process of the invention, steps (1) and (2) can be carried out successively, in the same moving bed furnace, or in at least two different moving bed furnaces. In the process of the invention, however, steps (1) and (2) can also be carried out simultaneously in at least two different moving bed furnaces.

The process of the invention is preferably such that the used catalyst is from a continuous and/or semi-regenerative type reforming process, i.e., a continuous type, semi-regenerative type or mixed type process.

The regeneration process of the invention allows the refiner to solve the problems caused by onsite regeneration of the prior art. In particular, the process allows better control of the two principal regeneration steps for a catalyst containing at least one precious metal, preferably platinum, namely coke combustion and oxychlorination. Further, the regeneration process of the invention means that the catalyst containing at least one precious metal can be manipulated away from the reaction site. This has not so far been envisaged by the skilled person, mainly because the manipulation of a very expensive catalyst containing at least one precious metal and offsite oxyhalogenation, preferably offsite oxychlorination, were difficult obstacles to overcome.

The regeneration process of the invention is carried out offsite, i.e., carried out outside a hydrocarbon treatment unit, preferably a catalytic reforming unit, and more generally away from the refinery site. The catalyst is removed from the reaction zones in the refinery then regenerated before its return to these zones.

Step (2) of the invention is followed by an offsite calcining step, more precisely a drying step at a temperature in the range 350° C. to 550° C. and in the presence of a gas containing oxygen, generally in the range 3% to 20% by volume of oxygen, for example at 500° C. in the presence of oxygen. This step is carried out in a manner which is well known to the skilled person.

The two steps (1) and (2) can be followed, independently of the optional calcining step described above, but after that calcining step if it is carried out, by an offsite reduction step for the catalyst, in order to activate the catalyst for use in the hydrocarbon treatment reaction, preferably a reforming reaction, and an optional offsite passivation step using sulphur. The nature of the additional metal present, if any, determines whether or not a sulphur passivation step is carried out: if the metal is tin, the sulphur passivation step is not carried out. The reduction and sulphur passivation steps are carried out before the catalyst is returned to the reaction zone. Finally, the regeneration process for the used reforming catalyst of the invention may comprise the reduction step and the optional passivation step, these steps being carried out offsite. Thus the process of the invention comprises an optional supplementary reduction step for the catalyst following oxyhalogenation in step (2). Further, the process of the invention may comprise an optional reduction step for the catalyst followed by a supplementary sulphuration step for the catalyst. These steps, however, can also be carried out at the refinery site, i.e., onsite, generally in the hydrocarbon treatment unit, preferably a catalytic reforming unit.

The optional offsite reduction step is a conventional treatment step in a gas which contains hydrogen, at a temperature generally in the range 200° C. to 700° C.

The optional offsite sulphuration step is a conventional treatment step in gas which preferably contains hydrogen and a sulphur-containing compound selected from the group comprising sulphides (mono-, di- or polysulphides), hydrogen sulphide, mercaptans, thiophenes and any other sulphur-containing compounds which can decompose to $H_2S$ in hydrogen.

The catalyst which is regenerated using the process of the invention is a catalyst containing at least one precious metal selected from the group formed by silver, gold, ruthenium, rhodium, palladium, osmium, iridium and platinum, preferably platinum, optionally and preferably at least one halogen, preferably chlorine (generally at a concentration in the range 0 to 3% by weight, preferably in the range 0.5% to 1.1% by weight of chlorine in the case of a used catalytic reforming catalyst) and at least one porous support selected from alumina, silica, zeolite or charcoal type supports; preferably, the catalyst is a conventional catalytic reforming catalyst. With a catalytic reforming catalyst, the catalyst which is regenerated using the process of the invention is a porous solid, generally in the form of small rods (extrudates), spherules or grains, which normally comprise alumina, chlorine, platinum and at least one additional metal. The additional metal is generally selected from the group formed by metals from groups 7, 8, 9, 10, 13 and 14 of the periodic classification of the elements and copper, such as thallium, manganese, germanium, indium, iridium, rhenium or tin, preferably rhenium in the case of a semi-regenerative reforming process, or tin in the case of a continuous type process.

Preparation of the regenerated catalyst using the process of the invention is conventional. In the preferred case of a reforming catalyst, it generally comprises fixing the metals on a support by impregnation; the ionic precursor, which is water soluble, is exchanged at the surface of an alumina support; the catalyst is then drained, filtered and dried; it then undergoes calcining in a current of air at a temperature which is generally slightly above 500° C. After calcining, the catalyst must then be reduced in order to be ready for use. This operation is carried out at high temperature in hydrogen. Finally, before being brought into contact with the hydrocarbons, it is generally necessary to reduce the hydrogenolyzing activity of the small metallic particles by injecting a sulphur compound: this is the optional sulphuration step for the catalyst, which is carried out especially if the additional metal is ruthenium or iridium.

The used catalyst, i.e., the one to be regenerated, generally comprises at least 1% by weight of carbon, preferably in the range 3% to 20%. In the preferred case of a used catalytic reforming catalyst, the chlorine content is generally in the range 0.5% to 1.1% by weight.

Step (1) is a step for combustion of the coke present in the catalyst in the presence of an oxygen-containing gas, at a temperature in the range 300° C. to 680° C., preferably in the range 350° C. to 550° C., more preferably in the range 350° C. to 470° C., for a time in the range 0.3 to 7 hours. In the regeneration process of the invention, this step (1) for coke combustion is carried out in a thin layer furnace, preferably a rotolouvre furnace or a belt furnace. These furnaces mean that high gas flow rates can be used. These furnaces also do not require a chlorine compound to be injected during this step, since there is good chlorine retention after combustion. Further, the catalyst is not exposed to excesses in the $CO/CO_2$ or $H_2O$ concentrations as is the case in onsite regeneration processes. Finally, hot spots and gas channelling are reduced. The moving bed furnaces described above, for example rotolouvre furnaces and belt furnaces (thin layer moving bed furnaces), are conventional and known to the skilled person.

The catalyst from coke combustion step (1) contains less than 1% by weight of coke, preferably less than 0.5% by weight, and the halogen concentration, preferably chlorine, in the catalyst is generally more than 0.2%, preferably more than 0.5% by weight in the preferred case where the used catalyst contains a halogen, preferably chlorine.

Step (2) is an oxyhalogenation step, preferably oxychlorination, in a controlled air atmosphere, generally and preferably containing 0.1 to 1% (by volume) of water, at a temperature in the range 300° C. to 650° C., preferably in the range 350° C. to 550° C., for a period in the range 0.3 to 3 hours in the presence of a halogenated compound, preferably a chlorine compound, for example in the case when the halogen is chlorine, a chlorine compound containing 1 to 6 carbon atoms per molecule such as carbon tetrachloride $CCl_4$. The final concentration of halogen, preferably chlorine, in the catalyst is generally in the range 0.9% to 1.2% by weight, preferably in the range 1.0% to 1.1% by weight in the preferred case where the used catalyst comprises a halogen, preferably chlorine. In the regeneration process of the invention, step (2) can be carried out immediately after coke combustion step (1), or the catalyst can be stored for some time under appropriate conditions (generally in barrels or sacks, protected from water) before carrying out step (2). Coke oxyhalogenation step (2), preferably oxychlorination, is carried out in a furnace which may or may not be distinct from the furnace for combustion step (1), selected from the moving bed furnaces described above, for example agitated bed furnaces, for example a sealed rotating furnace, which cannot be used in conventional onsite regeneration processes. The use of this type of furnace improves the homogeneity of the catalyst treatment by avoiding, for example, the onset of gas channelling by the treatment gas. Further, there is great flexibility in the operating conditions for oxyhalogenation step, preferably oxychlorination; thus in the preferred case where the halogen is chlorine, it is possible to operate under overchlorinating conditions, leading to a chlorine content in the catalyst after step (2) of more than 1.3% by weight, for example.

The moving bed furnaces described above, such as sealed rotating furnaces, are conventional and known to the skilled person.

As indicated above, in a variation of the process the two steps (1) and (2) can be carried out simultaneously in the same moving bed furnace.

The characteristics of the catalyst after oxyhalogenation step (2), preferably oxychlorination, are generally as follows. The coke content in the catalyst is generally less than 0.5%, preferably less than 0.1% by weight. The content of the halogen, preferably chlorine, is generally greater than 0.3% by weight of halogen, and more particularly for a reforming catalyst, the content is generally in the range 0.8% to 1.3% by weight of chlorine, preferably in the range 0.9% to 1.2% by weight of chlorine and more preferably in the range 1.0% to 1.1% by weight of chlorine. The dispersion of the metallic phase must be substantially increased by oxyhalogenation, preferably oxychlorination. The dispersion is expressed as a non-dimensional figure which is the ratio between the number of accessible metal atoms on the surface and the total number of atoms, and is measured by quantitative gas chemisorption techniques, in particular chemisorption of oxygen. The specific surface area of the catalyst is generally little modified by oxyhalogenation, preferably oxychlorination. In the case of a reforming catalyst, the specific surface area is generally in the range 50 to 300 m$^2$/g, usually in the range 120 to 230 m$^2$/g.

EXAMPLES

The following examples illustrate the invention without in any way limiting its scope. They were carried out on a pilot plant.

EXAMPLE 1

Offsite regeneration of a used Pt/Sn type reforming catalyst

A used reforming catalyst containing platinum and tin, and 12.5% of carbon, was regenerated using step (1) followed by step (2). The catalyst contained 0.95% by weight of chlorine.

Coke combustion step (1) was carried out at 440° C. in air, at an hourly space velocity for the gas of about 3600 h$^{-1}$ for a time of 2 hours. The furnace which is used is a moving bed and thin layer bed, used in isothermal conditions derived from a MEMERT type furnace.

Oxychlorination step (2) was carried out at 500° C. for 5 hours in an atmosphere of air (200 l/h space velocity) containing a chlorine compound, carbon tetrachloride, injected at a flow rate of 0.8 ml/h. After 2 hours of treatment, the temperature was 530° C. The furnace which is used is a moving bed and thin layer bed, used in isothermal conditions derived from a MEMERT type furnace.

The results obtained are shown in Table 1 below. The specific surface area (SS) was measured using the BET method, the dispersion was measured by adsorption of oxygen and the chlorine content was measured using a conventional conductimetric technique (using a silver solution, and a 0.1N nitric acid solution to liberate chlorine from the catalyst surface), on a 10 g sample.

TABLE 1

| Catalyst characterisics after treatment step: | |
|---|---|
| Carbon combustion | <0.1% by weight C |
| | SS = 170 m$^2$/g |
| | 0.83% by weight Cl |
| | 79% dispersion |
| Oxychlorination | <0.1% by weight C |
| | SS = 162 m$^2$/g |
| | 1.1% by weight Cl |
| | 100% dispersion |

Compared with fresh catalyst, i.e., a catalyst before its introduction for the first time into the catalytic reforming zone, which had a chlorine content of 1.1% by weight, a 100% dispersion and a specific surface area of 175 m$^2$/g, the characteristics of the catalyst after oxychlorination were highly satisfactory.

EXAMPLE 2

Offsite regeneration of a used Pt/Re type reforming catalyst

A used reforming catalyst containing platinum and rhenium, and 12.7% of carbon, was regenerated using step (1) followed by step (2). The catalyst contained 1.05% by weight of chlorine.

Coke combustion step (1) was carried out at 450° C. in air, at an hourly space velocity for the gas of about 3600 h$^{-1}$ for a time of 2 hours. The furnace which is used is a moving bed and thin layer bed, used in isothermal conditions derived from a MEMERT type furnace.

Oxychlorination step (2) was carried out at 530° C. for 5 hours in an atmosphere of air (200 l/h space velocity) containing a chlorine compound, carbon tetrachloride, injected at a flow rate of 0.9 ml/h. After 2 hours of treatment, the temperature was 530° C. The furnace which is used is a moving bed and thin layer bed, used in isothermal conditions derived from a MEMERT type furnace.

These steps were followed by a reduction step at 350° C. for 1 hour with a gas containing 5% of H$_2$/N$_2$ at an hourly space velocity of 1000 h$^{-1}$, then a sulphuration step with a gas containing 3% of H$_2$S in H$_2$ to passivate the rhenium phase before using the catalyst again for catalytic reforming.

The results obtained are shown in Table 2 below, with the same indications as for Table 1 of Example 1:

TABLE 2

| Catalyst characteristics after treatment step: | |
|---|---|
| Carbon combustion | <0.1% by weight C |
| | SS = 172 m$^2$/g |
| | 0.79% by weight Cl |
| Oxychlorination | <0.1% by weight C |
| | SS = 168 m$^2$/g |
| | 1.1% by weight Cl |
| | 100% by dispersion |

Compared with fresh catalyst, i.e., a catalyst before its introduction for the first time into the catalytic reforming zone, which had a chlorine content of 1.1% by weight, a 100% dispersion and a specific surface area of 180 m$^2$/g, the characteristics of the catalyst after oxychlorination were highly satisfactory.

We claim:

1. A process for the regeneration of a used hydrocarbon treatment catalyst containing at least one precious metal selected from the group consisting of silver, gold, ruthenium, rhodium, palladium, osmium, iridium and platinum, and at least one porous support, said process comprising:

conducting at least one combustion step (1) for the coke present on said catalyst in the presence of an oxygen-containing gas, at a temperature in the range of 300° C. to 680° C. for a time in the range of 0.3 to 7 hours, and conducting at least one oxychlorination step (2) in a controlled air atmosphere, at a temperature in the range of 300° C. to 650° C., for a time in the range of 0.3 to 3 hours and in the presence of a chlorinated compound such that the chlorine content in the catalyst after step (2) is more than 1.3% by weight wherein said combustion step (1) is carried out offsite in a moving bed furnace and said oxychlorination in step (2) is carried out offsite in a sealed rotating furnace which avoids the onset of gas channeling by the treatment gas.

2. A process according to claim 1, in which steps (1) and (2) are carried out successively in the same moving bed furnace.

3. A process according to claim 1, in which steps (1) and (2) are carried out successively in at least two different moving bed furnaces.

4. A process according to claim 1, in which steps (1) and (2) are carried out simultaneously in at least two different moving bed furnaces.

5. A process according to claim 1 in which said precious metal is platinum.

6. A process according to claim 1 in which said catalyst contains a halogen.

7. A process according to claim 1 in which said support is alumina.

8. A process according to claim 1 in which said catalyst contains at least one additional metal selected from the group consisting of metals from groups 7, 8, 9, 10, 13 and 14 of the periodic classification of the elements and copper.

9. A process according to claim 1 in which said catalyst is a used reforming catalyst from a continuous, semi-regenerative or mixed type process, containing platinum, chlorine, alumina and at least one additional metal selected from the group consisting of metals from groups 7, 8, 9, 10, 13 and 14 of the periodic classification of the elements and copper.

10. A process according to claim 1 comprising a supplementary calcining step for the catalyst after oxychlorination step (2).

11. A process according to claim 1 comprising a supplementary reduction step for the catalyst after oxychlorination step (2).

12. A process according to claim 11, comprising a supplementary sulphuration step following the reduction step.

13. The process of claim 1, wherein the moving bed furnace for combustion on step (1) is a thin layer moving bed furnace.

14. The process of claim 1, wherein the catalyst is stored between the combustion step (1) and oxychlorination step (2).

* * * * *